United States Patent
Luft

[15] 3,677,358
[45] July 18, 1972

[54] DRIVE TRAIN FOR LOW PROFILE VEHICLE

[72] Inventor: Robert G. Luft, Wildwood, Ill.
[73] Assignee: International Harvester Company, Chicago, Ill.
[22] Filed: April 16, 1971
[21] Appl. No.: 134,557

[52] U.S. Cl............................180/44 R, 180/54 R, 180/70 R, 280/111
[51] Int. Cl.............................................B60k 5/08
[58] Field of Search .................. 180/44, 45, 46, 47, 49, 54 R, 180/70 R

[56] References Cited

UNITED STATES PATENTS 3,064,746  11/1962  Williamson ..........................180/54 R
3,331,464  7/1967  Van Doorne...........................180/44 R

FOREIGN PATENTS OR APPLICATIONS 1,927,737  2/1970  Germany..............................180/54 R
495,022  11/1938  Great Britain .......................180/44 R Primary Examiner—A. Harry Levy
Attorney—Floyd B. Harman

[57] ABSTRACT

A compact drive train for a low profile vehicle positions the engine, torque converter and transmission between the vehicle axles, the engine being offset from the longitudinal centerline of the vehicle and the transmission being positioned on the centerline of the vehicle in side-by-side relationship with the engine, and both axles being driven from a drop box by means of a pair of drive shafts, one of which extends underneath the transmission.

5 Claims, 3 Drawing Figures

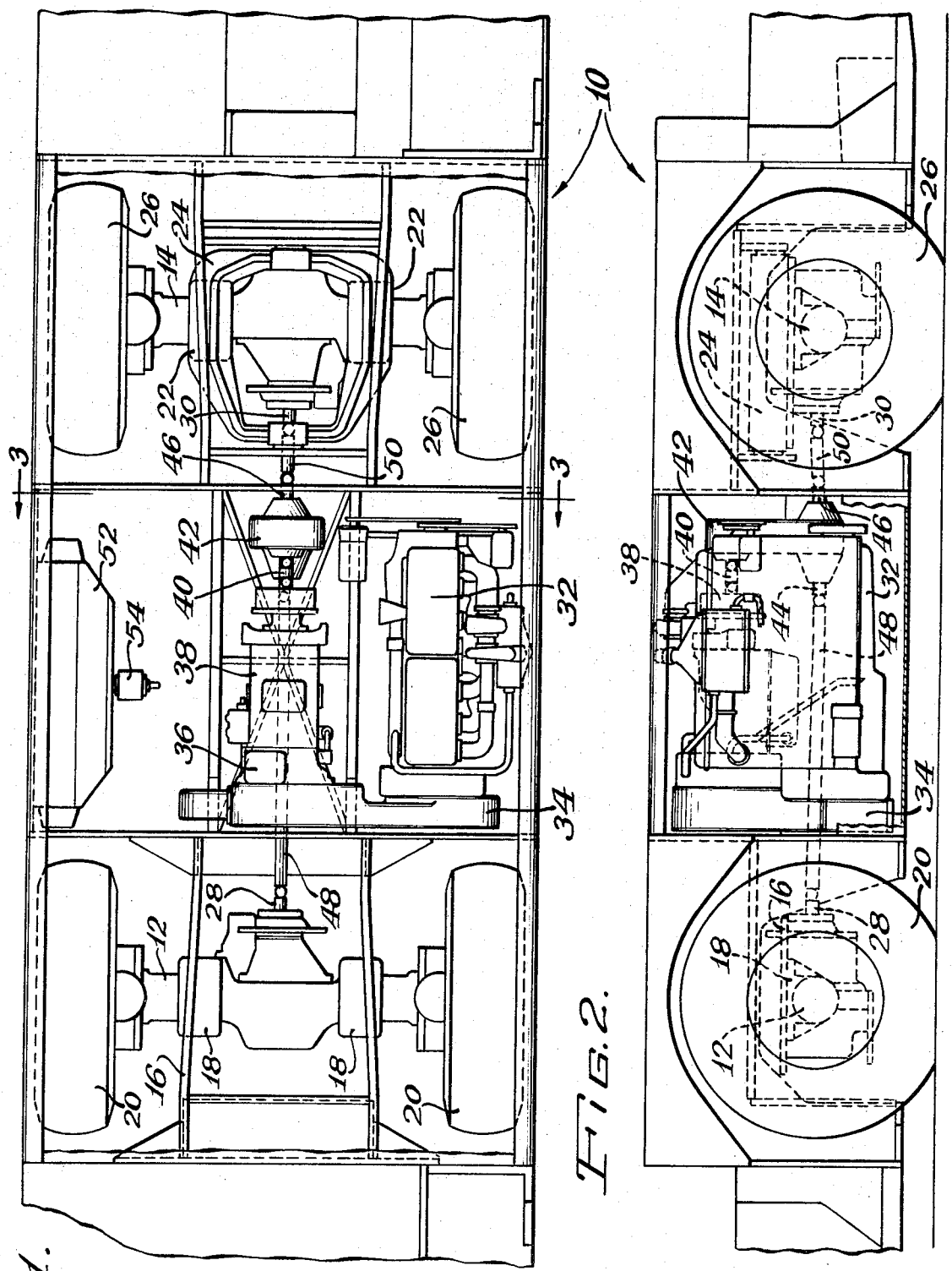

Patented July 18, 1972
3,677,358
2 Sheets-Sheet 2
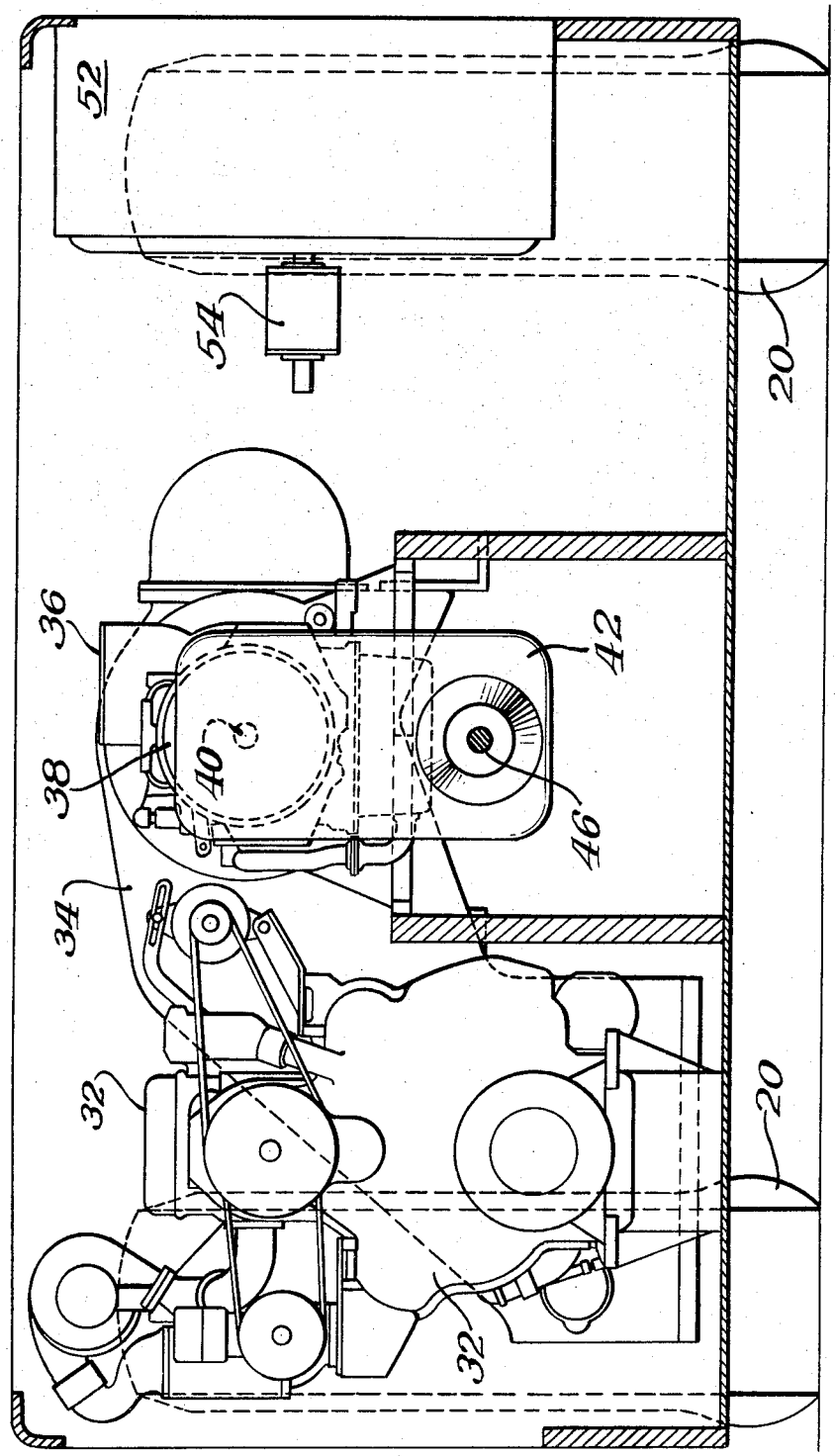
Inventor:
Robert G. Luft
By Ronald C. Kamp
Atty.

1

DRIVE TRAIN FOR LOW PROFILE VEHICLE

CROSS REFERENCE TO RELATED APPLICATION

This invention is similar to that disclosed in application, Ser. No. 796,371 filed Feb. 4, 1969, now U.S. Pat. No. 3,614,989 granted Oct. 26, 1971.

BACKGROUND AND SUMMARY OF THE INVENTION

Machines for towing and ground manipulation of aircraft must have sufficient drawbar power to move the aircraft at acceptable ground speeds, must be maneuverable in both forward and reverse directions, must have a relatively low profile in order that the machine can go under the wings and most other appendages of the aircraft and desirably has a relatively flat top surface which may function as an elevated working platform and has both ends of the vehicle free to accept equipment, such as auxiliary power units, necessary for service and maintenance of the aircraft.

It is therefore an object of the present invention to provide a vehicle for filling the requirements outlined above.

It is also an object of this invention to provide a vehicle in which the entire power train is positioned between the axles to maintain a low profile and having both ends of the vehicle free to accept operator stations and auxiliary equipment.

These and other objects of the present invention and many of the attendant advantages thereof will become more readily apparent upon perusal of the following description and the accompanying drawings, wherein:

FIG. 1 is a top plan view of a vehicle having a drive train arrangement according to the present invention;

FIG. 2 is a side elevational view of the vehicle of FIG. 1; and

FIG. 3 is a cross sectional view taken on line 3—3 of FIG. 1.

DESCRIPTION OF A PREFERRED EMBODIMENT

Referring now to the drawings, there is shown a vehicle, indicated generally at 10 having a pair of axles 12 and 14. The rear axle 12, the designations front and rear being used here for convenience since the vehicle may have an operator's station at each end, is attached to the vehicle frame 16 through securing pads 18 and are supported by ground-engaging wheels 20. The front axle is provided with similar securing pads 22 which are secured to a bolster 24 which is pivotally secured to the frame 16 about a longitudinal axis, permitting the front axle 14 to oscillate relative to the frame. The front axle 14 is supported on ground-engaging wheels 26. The axles 12 and 14 include a differential which is driven through differential input shafts 28 and 30 respectively.

Power for the vehicle 10 is supplied by a prime mover, such as an internal combustion engine 32, which is mounted between the two axles and to one side of the longitudinal centerline of the vehicle. A transfer case 34 is secured to the output end of the engine 32 and extends inward towards the longitudinal centerline of the vehicle and upward to drivingly connect with a torque converter 36. A direction and speed change transmission 38 is driven by the output from the torque converter 36. For convenience and conservation of space, it is often desirable to enclose the torque converter and transmission in the same housing or in separate housings directly affixed to each other. The output from the transmission 38 is connected through a shaft 40 with the input to a drop box 42 which extends downward and has double output shafts 44 and 46. The torque converter, transmission and drop box are all positioned substantially on the longitudinal centerline of the vehicle. The output shaft 44 of the drop box 42 is connected with a drive shaft 48 which is connected at its other end with the input shaft 28 of the rear axle differential. This drive shaft extends underneath the transmission, the torque converter and the transfer case to affect its connection with the rear axle differential input 28. The other output shaft 46 of the drop box 42 is connected with the differential input 30 of the front axle 14 through a drive shaft 50.

Cooling for the engine 42 is provided by a radiator and fan assembly 52 which is located on the side of the transmission and torque converter opposite to the engine. Power for driving the fan of the radiator fan assembly 52 is provided by a power means 54, which may be any conventional means, such as an electric motor, a hydraulic motor or through mechanical belt drive through equally conventional pulley means off of the transfer case 34. A tank for holding the fuel for the engine 32 may be positioned underneath the radiator fan assembly 52 forward of the rear wheel 20 and laterally to the side of the drop box 42 and transmission 38.

From the foregoing description, it will be appreciated that the arrangement of components provides a vehicle with all of the desired attributes for its intended purpose. Specifically, the major components of the vehicle are all congregated between the two axles in a manner to maintain a low profile and yet achieve reasonable maneuverabliliy, leaving both ends of the vehicle outside of the axles free to accept operator's stations and auxiliary equipment.

While a preferred embodiment of the present invention has been shown and described herein, it will be apparent that various modifications and changes may be made therein without departing from the invention.

What is claimed is:

1. A compact power train for a vehicle which permits a low profile, said vehicle including a frame supported on wheeled front and rear axles; said power train comprising:
    a transmission including a casing mounted on the frame between the axles and positioned on the longitudinal centerline of the vehicle;
    a torque converter attached to the transmission casing adjacent the rear axle and operatively coupled to the transmission for transmitting power thereto;
    an engine mounted on the frame between the axles and positioned adjacent to and laterally to the side of the transmission;
    a transfer drive means operatively connected between the engine and the torque converter for transmitting power from the engine to the torque converter;
    a drop box positioned between the transmission and the front axle and connected with the transmission to be driven thereby;
    a first drive shaft extending beneath the transmission from the drop box to the differential input means of the rear axle and a second drive shaft extending from the drop box to the differential input means of the front axle.

2. A compact power train for a vehicle which permits a low profile, said vehicle having a frame supported on wheeled front and rear axles, each axle including a differential, said power train comprising:
    an engine mounted on the vehicle frame to one side of the frame's centerline and positioned between the axles;
    a transfer drive means operatively coupled to the engine and extending inward and upward;
    a torque converter positioned on the frame's centerline and coupled with the transfer drive means;
    a direction and speed change transmission positioned on the frame's centerline and coupled with the torque converter;
    a drop box coupled to the transmission and positioned on the frame's centerline, the drop box extending downward and having a pair of output shafts adjacent its lower end;
    a first drive shaft connected to one of the output shafts and with one axle's differential;
    and a second drive shaft connected to the other output shaft extending under the transmission and torque converter and connected to the other axle's differential.

3. In a vehicle having a frame supported on wheeled front and rear axles, each axle including a differential; the improvement comprising:
    an engine mounted on the frame on one side of the vehicle and between the axles;
    a transfer drive means connected with the engine and extending inward and upward;
    a torque converter, transmission and drop box respectively arranged in serial driving connection in a central position on the frame between the axles, the torque converter being connected to the transfer drive means and the drop box extending downward and having a pair of output stubs at its lower end;

drive shaft means extending from each stub to one of the differentials.

4. In a vehicle according to claim 3, and further comprising: engine cooling means including a fan positioned on the frame on the opposite side of the vehicle between the axles;

and means for transmitting power to the fan.

5. In a vehicle according to claim 4, and further comprising: fuel tank means positioned on the frame on said opposite side underneath the engine cooling means and between the axles.

* * * * *